April 2, 1968 R. L. MYERSON 3,375,582

PREFABRICATED VENEER AND MATCHING DESTRUCTIBLE BACKING PATTERN FOR DENTAL RESTORATIONS

Filed March 1, 1963 4 Sheets-Sheet 1

INVENTOR.
RICHARD L. MYERSON
BY
Dike, Thompson, Bronstein & Mrose
ATTORNEYS

PREFABRICATED VENEER AND MATCHING DESTRUCTIBLE BACKING PATTERN FOR DENTAL RESTORATIONS

Filed March 1, 1963 4 Sheets-Sheet 2

INVENTOR.
RICHARD L. MYERSON
BY
Dike, Thompson, Bronstein & Mrose
ATTORNEYS

INVENTOR.
RICHARD L. MYERSON
BY
Dike, Thompson, Bronstein & Mrose
ATTORNEYS

April 2, 1968 R. L. MYERSON 3,375,582

PREFABRICATED VENEER AND MATCHING DESTRUCTIBLE BACKING PATTERN FOR DENTAL RESTORATIONS

Filed March 1, 1963 4 Sheets-Sheet 4

INVENTOR.
RICHARD L. MYERSON
BY
Dike, Thompson, Bronstein & Mrose
ATTORNEYS

United States Patent Office 3,375,582
Patented Apr. 2, 1968

3,375,582

PREFABRICATED VENEER AND MATCHING DESTRUCTIBLE BACKING PATTERN FOR DENTAL RESTORATIONS

Richard L. Myerson, Newton, Mass., assignor to Myerson Tooth Corporation, Cambridge, Mass., a corporation of Massachusetts Filed Mar. 1, 1963, Ser. No. 262,047
4 Claims. (Cl. 32—12)

The present invention relates to dental restorations, such as crowns, artificial teeth, inlays, bridges, etc., made of a metal casting having a veneer of plastic, and a method for making the same; more particularly it relates to a prefabricated veneer and a matching destructible, prefabricated backing pattern consumed during manufacture of the restoration and for use with the prefabricated veneer to join and retain the veener to the metal casting.

Methods which have been proposed for making such restorations include forming a wax pattern on a replica of the prepared tooth, in the case of crowns, conforming to the shape of the metal casting which is to be cast, applying retention forming means of heat destructible material to the labial or buccal surface of the wax pattern such as, pins, spheres, and other retention means, investing the resulting pattern in the usual manner and replacing the wax and retention forming means by metal in the usual casting process. These methods usually include applying wax to the labial or buccal surfaces of the casting, carving the wax to the desired shape and size, investing in the usual way and replacing the wax by plastic material comprising a dentine and enamel layer. The blending and finishing of these layers in situ is subject to the skill and artistry of the individual and results in a considerable proportion of unsatisfactory results. Furthermore, this type of processing employed by the dental technician does not lend itself to procuring the optimum physical properties of the materials used.

To avoid this, some technicians grind plastic artificial teeth made for full dentures to a thin veneer with a lingual surface ground to fit the labial or buccal shape of the metal casting. Then, it is waxed to the metal, invested and the wax replaced by a cement, usually a polymer-monomer slurry of the appropriate color and opacity. However, by this method it is difficult to grind a tooth thin enough and well enough to fit the metal and retain its original color.

Accordingly, it is an object of the present invention to provide a thin prefabricated veneer for attachment to the metal casting to thereby avoid the above-mentioned problems involved in blending and molding the veener in situ and in grinding it from artificial teeth. This permits the blending, color, carving and physical properties of such prefabricated veneers to be controlled by more exacting, simple and less costly and sensitive production methods. By providing an assortment of sizes, shapes and colors, it is possible in most cases to find the proper veneer for the particular restoration involved. Preferably, the prefabricated veneer is in the form of a thin, curved shell the labial or buccal surface of which is similar to the labial or buccal surface of the natural tooth which is to be simulated.

A problem with the use of prefabricated veneers is to obtain a satisfactory fit between the veneer and metal casting. The use of the veneer as a template on the labial or buccal side in making the wax pattern used to form the metal casting, to thereby shape the labial or buccal surface of the wax pattern by the lingual surface of the veneer, is not entirely satisfactory because it is necessary to subsequently cut into the labial or buccal surface of the wax to form retention devices or to scrape away the wax and attach granules of material, as described above. This step is time consuming and must be done with considerable care to insure good seating of the veneer and good retention.

Accordingly, it is another object of the invention to overcome these problems arising with the use of prefabricated veneers by providing a matching, thin, prefabricated backing pattern of destructible (preferably heat destructible) material having a labial or buccal contour which matches the lingual contour of the veneer and which has one or more retention devices, e.g. protrusions thereon. This prefabricated backing pattern has the shape of the labial or buccal portion of the metal casting to be formed, such portion of the casting being formed or cast from the backing pattern. Each veneer is provided with a matching backing pattern. The shape of the backing pattern corresponds to the shape of the veneer, i.e., it is in the form of a thin, curved shell.

Another advantage of the use of a prefabricated pattern and prefabricated veneer in accordance with the present invention is that positioning of the retention devices on the backing pattern can be more accurately controlled, as compared to applying such devices directly to the wax pattern by the technician, to avoid, for example, clumping of granules when granules are applied as retention devices.

With the prefabricated veneer lightly fastened to the labial or buccal surface of the prefabricated backing pattern, the assembly is preferably held in the proper position on the replica of the prepared tooth with wax, after which the lingual, i.e., lingual to the backing pattern, and parts of the mesial, distal and occlusal aspects of the tooth are built up to the desired form and size with wax, to thereby provide a complete destructible pattern for the metal casting. The veneer is then removed from the backing pattern leaving the backing pattern adhered to the labial or buccal surface of the wax, the wax and backing pattern so assembled forming a heat destructible assembly pattern the labial or buccal face of which comprises the labial or buccal face of the backing pattern. Consequently, such labial or buccal face has the retention protrusions of the backing pattern thereon and has a good matching fit to the lingual aspect of the veneer. The heat destructible assembly pattern is then invested, burned out and cast in metal in the usual fashion. The labial or buccal aspect of the metal casting will be the same as that of the assembly and so it will be a close matching fit to the lingual aspect of the veneer and will have retention protrusions thereon.

The lingual surface of the veneer is then waxed to the labial or buccal surface of the casting, the retention protrusions on the labial or buccal face of the casting being embedded in the wax. The combination is then invested in a split or hinged plaster mold so that when the wax is softened by heating, the flask may be opened and the veneer retained in one half and the metal in the other. The wax is then removed by flushing in the usual manner. An opaque or masking material may be applied at this stage to the metal, although if it is desired, it may be applied to the metal before the veneer is waxed to the metal casting. A suitable plastic cement is then applied between the veneer and casting to replace the wax and the cement cured in the investment mold to bond the veneer to the labial or buccal surface of the metal casting with the retention protrusions on the labial or buccal face of the casting embedded in the cement. The cement applied between the veneer and casting is preferably a polymer-monomer mix, e.g. acrylic, of a color and opacity that is appropriate to develop the final esthetics of the restortation. The usual techniques used to cure this polymer-monomer mix are followed to produce the final restoration in which the metal retention protrusions on the labial or buccal surface of the casting are embedded in the cured plastic cement layer between the veneer and metal and in which the plastic cement is bonded to the plastic veneer. The restoration is then polished and trimmed if desired or needed.

Bridgework to replace missing teeth is usually fixed on standing natural teeth which are prepared to receive crowns which serve as abutments and the missing teeth (bridgework) are joined to such crowns. These bridgework teeth are called supplies. They can be made in accordance with the present invention in the same manner as the crowns which have been described above except that there is no prepared tooth and, therefore, no replica of it. With the prefabricated veneer lightly fastened to the labial or buccal surface of the prefabricated backing pattern, wax is added to build it up to the size and shape of the supply tooth required, e.g. a bicuspid, with the proper gingival, occlusal, lingual, mesial and distal contour, followed by removal of the veneer, investment of the assembly of the wax pattern and backing pattern, casting a metal duplicate of the assembly and cementing the veneer to the casting all as described above.

Other objects and advantages of the present invention will be apparent from the following description and accompanying drawings in which:

FIG. 1 is a view in perspective showing a prefabricated plastic veneer and prefabricated matching backing pattern of heat destructible material for a crown, together with the wax pattern of the crown built up over a replica of the repaired tooth; in practicing the invention, this wax pattern is built up on the concave lingual surface of the backing pattern, but in this figure it is shown as separated from the backing pattern for purposes of illustration; the wax sprue former and wax crucible former conventionally formed on the wax pattern are omitted for simplicity, but are shown in FIG. 7;

FIG. 2 is a view like FIG. 1 of the veneer and backing pattern taken from a different angle to show the lingual aspect of these members and to demonstrate the thin, curved shell shape of these members.

FIG. 3 is the same as FIG. 1 showing the wax pattern of FIG. 1 waxed to the lingual surface or contour of the backing pattern; in practicing the invention the wax pattern is preferably waxed to, i.e., built up on, the concave lingual surface of the backing pattern with the veneer lightly held or tacked to the labial contour of the backing pattern as shown in FIG. 5, but for purposes of demonstration it is shown in FIG. 3 as being separated from the backing pattern.

Figure 1:
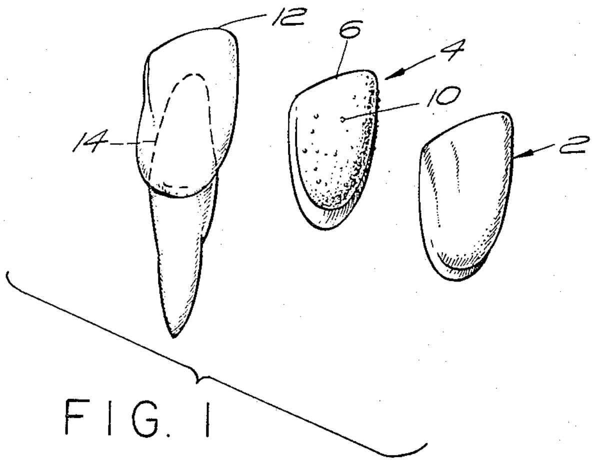
Figure 2:
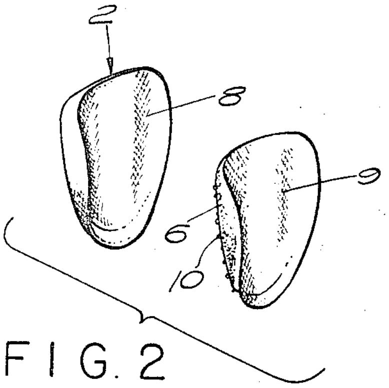
Figure 3:
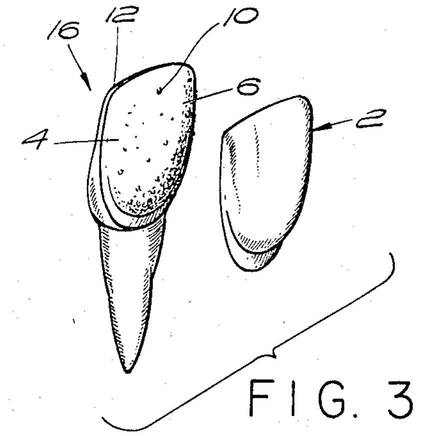
Figure 4:
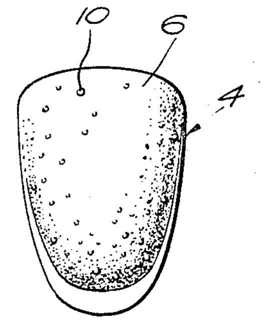
FIG. 4 is a front view of the labial surface of the backing pattern of FIG. 1, showing clearly the retention devices thereon, which, in the particular embodiment shown, happen to be a plurality of granular shaped protrusions distributed thereover.
Figure 5:
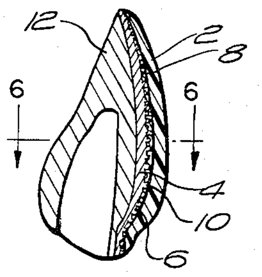
FIG. 5 is a vertical section through the backing pattern with the wax pattern waxed to the lingual contour thereof as in FIG. 3 but with the lingual contour of the veneer lightly held on the labial contour of the backing pattern.
Figure 6:
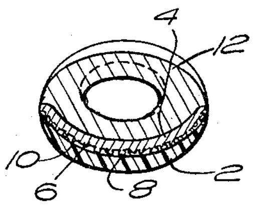
FIG. 6 is a horizontal section through the backing pattern, veneer and wax pattern of FIG. 5.

With reference to the drawings, 2 indicates a prefabricated plastic veneer for a crown and embodying the present invention. It is in the form of a thin, curved shell. 4 comprises a prefabricated matching backing pattern embodying the present invention made of a heat destructible (e.g., decomposes by combustion when heated) material and having a convex labial contour 6 which matches the concave lingual contour 8 of the veneer and which in one form of the invention has a plurality of tiny, granular-shaped, heat-destructible, undercut protrusions 10 spaced thereover, such protrusions being attached to or formed on the backing pattern in a manner to be described hereinafter. Backing pattern 4 is in the form of a thin, curved shell and fits within the thin, curved shell of the veneer, as shown. 12 represents the wax (heat destructible) pattern formed over the replica 14 of the prepared tooth and to the concave lingual surface 9 of the backing pattern 4, as shown in FIG. 3, i.e., the wax pattern is waxed to the lingual surface of the backing pattern 4 and around the replica 14. The veneer 2 is held lightly in place against the labial surface of backing pattern 4 while the wax pattern 12 is waxed to the lingual surface 9 of the backing pattern. The assembly 16 of the wax pattern 12 and the backing pattern 4 adhered to the labial surface thereof has the shape of the final metal casting of the crown. Since the labial surface of the backing pattern 4 forms the labial surface of the assembly 16, the contour of such labial surface of the assembly matches the lingual contour of the veneer 2 and is provided with the retention protrusions 10 shown as granular-shaped in FIGS. 1 to 12. The entire assembly is heat destructible, e.g., decomposes when heated. The wax pattern 12 and hence the assembly 16, is provided with a wax sprue former 18 and wax crucible former 20.

Figure 7:
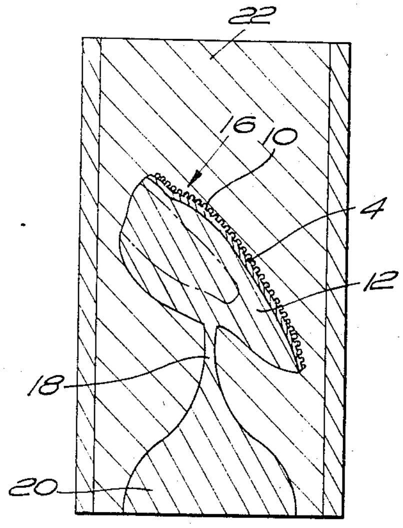
FIG. 7 is a vertical section showing the assembly of the wax pattern waxed to the backing pattern invested in a plaster mold, such section including a vertical section through the assembly of the wax pattern and the backing pattern as well as through the mold and showing the conventional wax sprue former and the wax crucible former of the wax pattern.
Figure 8:
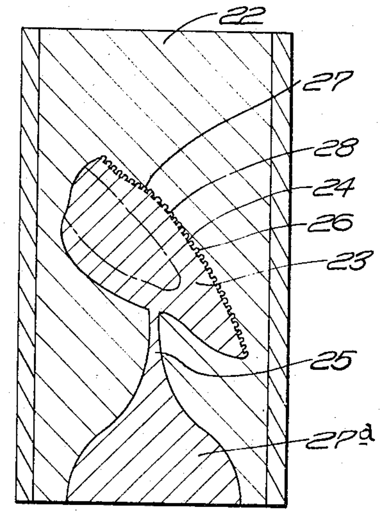
FIG. 8 is the same as FIG. 7 showing the metal casting in the plaster mold after the assembly of the wax pattern and backing pattern has been burned out and metal cast in its place.
Figure 9:
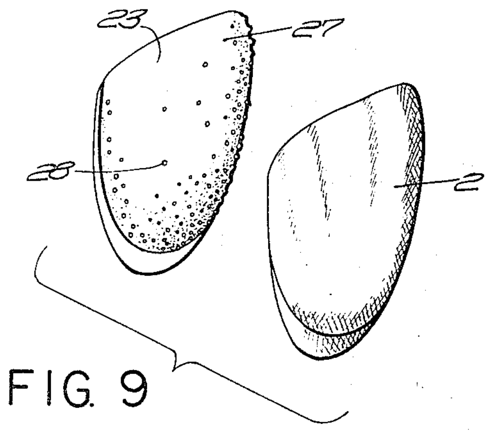
FIG. 9 is a view like FIG. 1 of the metal casting of FIG. 8 and the veneer before they are brought together.

After the wax pattern 12 has been waxed to the replica 14 and the lingual surface of the backing pattern 4, the veneer is removed and the assembly 16 is removed from the replica 14 of the prepared tooth and is invested in a mold 22, as shown in FIG. 7, burned out (the wax pattern and heat destructible backing pattern both decompose) and gold is cast into the resulting cavity to form the gold casting 23, as shown in FIG. 8.

Since the cavity in the mold 22 has the contour of assembly 16, the surface 24 thereof corresponding to the labial surface 6 of assembly 16 is like such labial surface and hence has spaced thereon recesses 26 of the same shape as the protrusions 10. Also, its contour matches the lingual contour 8 of veneer 2. Consequently, when the gold is cast therein the labial surface 27 of the casting 23 has a plurality of integral, granular-shaped, gold protrusions 28 spaced thereover of the same shape and number as protrusions 10 and also has a contour matching the lingual contour 8 of veneer 2.

The gold casting 23 is thereafter removed from the mold 22 and the metal sprue 25 and metal crucible 27a are removed therefrom.

Figure 10:
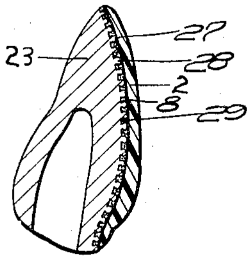
FIG. 10 is a vertical section through the casting and veneer and layer of wax therebetween.
Figure 11:
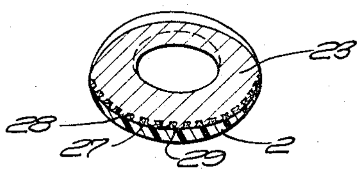
FIG. 11 is a horizontal section through the casting, wax and veneer of FIG. 10.

Then, the lingual surface 8 of the plastic veneer 2, as shown in FIGS. 10 and 11, is attached with wax to the labial surface 27 of the metal casting, the protrusions 28 being embedded in the layer of wax 29 between the casting and veneer.

Figure 12:
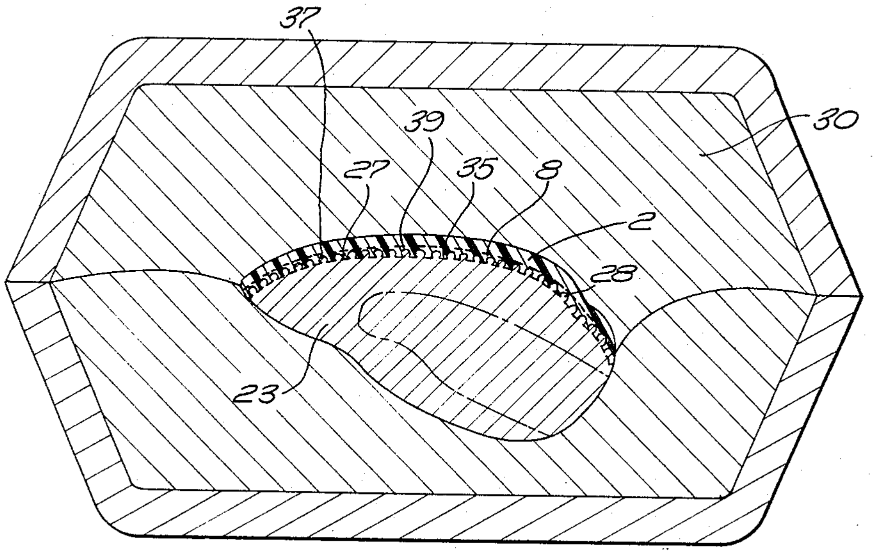
FIG. 12 is an enlarged vertical section showing the assembly of FIG. 11 after investment thereof in a plaster mold and replacement of the wax layer by a cured plastic cement to form the finished crown (except for polishing and trimming where desired) still in the mold.

Thereafter, the metal casting 23 with the veneer 2 waxed thereto is invested in a split flask 30, (see FIG. 12) and the wax removed by flushing with boiling water in the usual manner. Thereafter the labial surface 27 of the casting 23 is painted with a conventional opaque substance 37 in a conventional manner to give the desired visual effect in the final crown (if desirable the opaque may be applied before the veneer is waxed to the metal casting). A plastic cement 35 is placed between the opaqued labial surface 27 of the casting and the lingual surface 8 of the veneer 2 to take the place of the wax, whereafter the cement is cured in the mold, e.g. in the case of cement made up of a monomer-polymer mix, the monomer-polymer mix may be cured by heat to polymerize the monomer (or a self-curing monomer-polymer mix may be also used wherein no heat is required), to thereby bond the plastic veneer 2 to the casting 23, as shown in FIG. 12. The protrusions 28 of the labial surface 27 of the metal casting are embedded in the cured plastic cement 35 and the cured plastic cement forms a molecular bond 39 with the plastic veneer, to thereby securely retain the prefabricated veneer 2 to the casting, as shown in FIG. 12.

Thereafter, the resulting crown is removed from the mold and polished and trimmed as desired. It is ready for insertion and cementation by the dentist.

Figure 13:
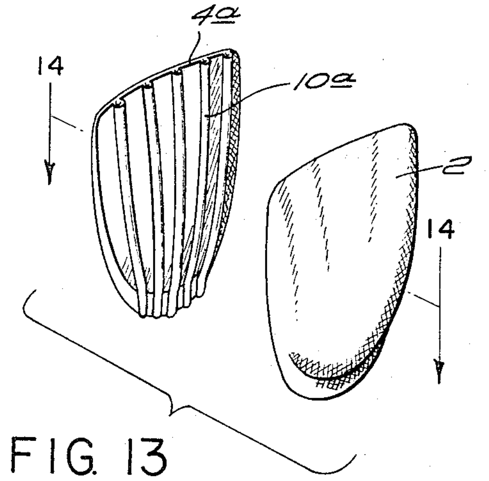
FIG. 13 is a view in perspective like FIG. 9 of another embodiment of the backing pattern having different kinds of retention protrusions, namely, a series of ribs with undercuts on the sides.
Figure 14:
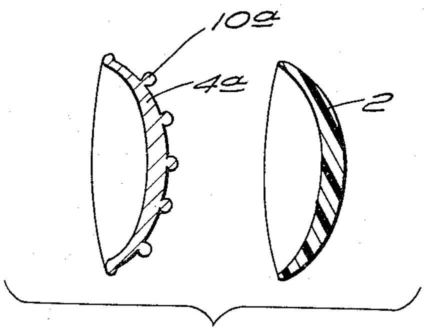
FIG. 14 is a horizontal section along the line 14—14 of the backing pattern and veneer of FIG. 13.

The use of a plurality of granular shaped heat destructible retention protrusions spaced over the labial surface of the backing pattern have been described above. FIGS. 13 and 14 disclose another type of retention protrusion which can be used comprising a plurality of elongated salid ribs 10a on the labial contour of the backing pattern 4a, which ribs are circular in cross sectional shape to provide undercuts. Other undercut cross sectional shapes can be used, e.g. a dove tail shape. Ribs 10a are formed simultaneously with the backing pattern sheet, e.g. by extrusion, or are made separately from the backing pattern sheet and applied to the labial surface of the backing pattern sheet. If desired, a single curved rib can be used, e.g. U or V or W or C or Z shaped or spiral shaped to provide positive retention, i.e. multidirectional retention, and the rib or ribs may extend longitudinally, as shown, or laterally. Also, criss cross longitudinal and lateral ribs at any desired angle to each other can be used. The ribs need not be continuous but may be interrupted.

Figure 15:
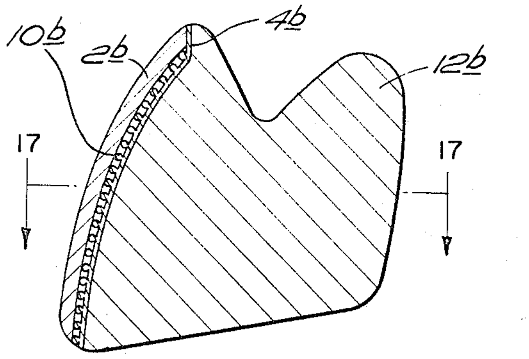
FIG. 15 is a vertical section of a wax pattern for a supply bicuspid tooth with the backing and veneer in place. The veneer will be removed prior to investing for casting the metal supply tooth and then the veneer will be cemented in the same fashion as described for the abutment tooth.
Figure 16:
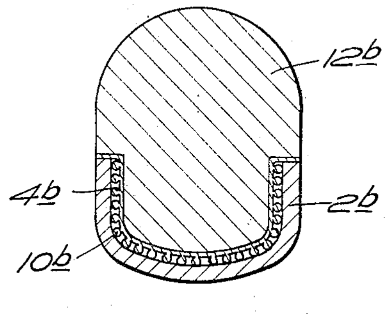
FIG. 16 is a horizontal section through the veneer, backing pattern and wax of FIG. 15.
Figure 17:
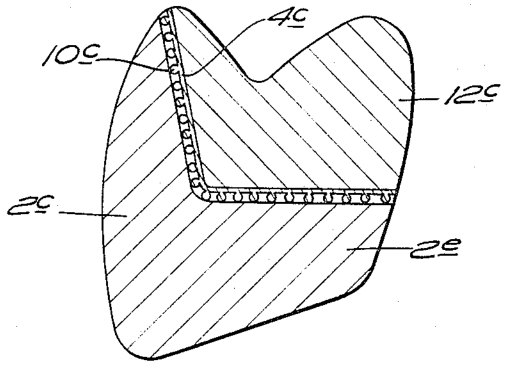
FIG. 17 is a vertical section of a veneer, backing pattern and wax pattern showing the added dimension that can be given to the veneer in the case of a supply tooth. Since space is not a factor in this use, the supply tooth can be considerably thicker and can contain a gingival portion.

The invention has been described above with respect to an anterior crown. It can also be used with bicuspid and molar crowns and to make anterior and posterior supply teeth for bridgework. FIGS. 15–17 show the invention applied to a bicuspid supply tooth which does not require a tooth replica, as in the case of a crown.

With reference to FIGS. 15 and 16 the wax pattern 12b of the bicuspid supply tooth is waxed to the lingual surface of the backing pattern 4b while the veneer 2b is tacked to the backing pattern in the same manner as in the case of the crown except that no tooth replica is used and the wax pattern 12b is shaped to form the whole supply tooth (except for the backing pattern and veneer 2b), as shown in FIG. 15. Thereafter, the veneer is removed and the resulting assembly of the wax pattern and backing pattern is invested, cast into a metal casting and the veneer cemented to the labial contour of the casting with a plastic as in the case of the crown described above. The buccal contour of the backing pattern 4b has a plurality of granular shaped retention protrusions 10b (they may be in the form of ribs also or any other shape) distributed thereover as in the case of the backing pattern for the crown so that the buccal surface of the casting has retention protrusions of like shape.

FIG. 17 shows the invention applied to a different kind of bicuspid supply tooth in which the veneer 2c is much thicker and contains a gingival portion 2e. The wax pattern 12c is waxed to the prefabricated backing pattern 4c, having granular shaped retention protrusions 10c, while the prefabricated veneer 2c is tacked to the backing pattern, as shown in FIG. 17, followed by removal of the veneer, investing of the wax pattern and backing pattern assembly, casting in metal and cementing the veneer to the casting, all as described above with reference to the crown. Whereas in the other figures the veneer has the shape of a thin curved shell, this is not the case in FIG. 17.

The procedure for the manufacture of the prefabricated veneer is not essential to the invention and is similar so that used to manufacture existing resin denture teeth. The plastic formulations of the veneers may be similar to existing resin teeth. The veneer has conventional body simulating and enamel simulating layers. These veneers can be made in a large variety of sizes, shapes and shades. They can be made according to mass production techniques at the factory not nearly as subject to individual artistry and not nearly as tedious as in the case where veneers are made in situ during manufacture of the restorations.

The backing pattern can be fabricated by applying retention protrusions of heat destructible material to sheet stock of heat destructible material with heat destructible cement, and forming the resulting stock in a mold to produce a labial or buccal surface which matches the lingual surface of the prefabricated veneer. The sheet stock and the protrusion material need not be the same. The requirement is that they be bonded sufficiently for handling, or they may be integral, and that they be destructible to form the labial or buccal portion and surface (with recesses) of the cavity in the investment material so that the molten metal can be poured in to form the desired metal casting having corresponding protrusions on the labial or buccal surface thereof.

The sheet stock can be made of various formable, heat destructible plastic materials such as cellulose acetate, cellulose butyrate, rigid vinyl sheeting, or acrylic materials. Thin wax sheets can also be used. The retention protrusion material can be small plastic particles as made by suspension polymerization of heat destructible acrylics, styrene, etc., or by grinding to an appropriate mesh size (e.g., finer than 28 mesh and coarser than 48 mesh) destructible materials, such as the plastics above (usually with the aid of liquid nitrogen) or more friable thermoset materials such as ureaformaldehyde or phenol formaldehyde. Granular-shaped wax particles can also be used.

Extruded plastic filament of appropriate diameter (e.g. 0.012" and of the particular plastic materials referred to above) and length can also be used for the retention protrusions either as a plurality cemented in place (either in parallel or at a predetermined angle to each other or at random) or as one length preferably cemented along the periphery thereof to the sheet. Where parallel ribs are used, the subsequent molding to the contour of the veneer to form the backing pattern curves the ribs and disturbs the parallelarity to thereby provide multi-directional positive retention. The sheet can also be extruded with raised ribs giving the same effect as cementing filaments on. Where filaments or integral ribs are used the cross sectional shape thereof should preferably be such as to provide an undercut when applied to the sheet. Furthermore, the retention protrusions can be made from cut filaments cemented to the sheet material at random or in a predetermined manner, e.g. to provide discontinuous ribs. Although in the preferred embodiment the backing pattern, including the retention protrusions on the labial or buccal surface thereof, is heat destructible by combustion it may be heat destructible by evaporation or sublimation or destructible by other means so as to provide a cavity corresponding to the shape thereof, after investment thereof.

A wide variety of adhesive materials can be used to cement the granular particles or filaments to the sheet stock and these can readily be determined by experiment as to the compatibility with the sheet stock and the granular particles. These cements include varnishes, shellacs, plastic lacquers, epoxies, polymer-monomer mixtures of acrylics such as methyl methacrylate, etc. They should be destructible also.

The cement used to cement the plastic veneer to the metal casting may be conventional polymer-monomer mixes used to make denture base materials, crowns and bridgework plastic restorations, e.g., polymer-monomer mixes of acrylics such as methyl methacrylate. Upon curing of such mixes, usually by heat, the monomer polymerizes to form a bond with the plastic of the veneer and to unite it to the casting.

An example of the process of the present invention is to mold a thin plastic veneer according to techniques known to those skilled in the art and having a shape corresponding to the veneer shown in the drawings. Sheet stock of cellulose acetate of approximately 0.005 inch thickness is coated with a lacquer made up of a solution of 10% polymethyl methacrylate dissolved in acetone. Before this solution dries, granules of approximately 0.015 inch in diameter made by suspension polymerization of methyl methacrylate are spread in a more or less uniform fashion over the surface of the wet sheet. The lacquer is then allowed to harden by evaporation of the solvent. The sheet stock with its coating of granules may they be heated to its softening point and formed or shaped into the shape shown in the drawings in a mold where it is cooled until it is rigid. The labial or buccal aspect of this mold substantially matches the lingual aspect of the prefabricated veneer. A similar example may be drawn from the use of a thin wax sheet, styrene granules, and shellac as the cement. The principal difference in the latter example is that the softening temperature is lower than that of the plastic sheet. Another example may be drawn from the use of extruded polystyrene sheet; that it, 0.007" thick with a series of raised ribs (parallel or otherwise) each approximately 0.012" in diameter and spaced about 0.063" apart. The cross section of these ribs is circular and they are attached to the main sheet in such a way as to leave substantial undercut for retention. The extruded sheet stock with its raised ribs may then be heated to its softening point and formed or shaped into the shape shown in the drawings in a mold where it is cooled until it is rigid.

Although in the above description, reference is made to the terms "labial" or "buccal" (front) and "lingual" (rear) to conveniently refer to the spatial relationships of the various surfaces and contours, the invention is not limited to applying a veneer to any particular surface of the casting. In fact, in many cases, the veneer will have a mesial and distal portion, as shown in FIGS. 15 and 16, and in some cases a gingival portion as shown in FIG. 17, and even an occlusal portion.

For the purposes of simplicity, in the appended claims, the word "labial" includes all these surfaces.

The term "granular-shaped" as used herein to describe the protrusions or particles or grains 10 of the backing pattern 4 and the corresponding protrusions 28 on the labial surface of the metal casting in the embodiment of FIGS. 1 to 12, includes spherical as well as other shapes, preferably shapes which provide undercuts for maximum retention of the veneer to the casting, e.g. irregular shapes such as those resulting from grinding.

The undercut protrusions on the labial or buccal surface of the backing pattern may be provided by die stamping the pattern with such protrusions, or by molding the pattern with such protrusions or by extrusion of the pattern with such protrusions or by cutting or punching the protrusions in the surface of the backing pattern. Where punching or cutting is used it may be desirable to apply a thin sheet of destructible material to the lingual aspect of the backing pattern to prevent wax from flowing through any holes formed which might destroy the undercuts.

Although the retention devices described above are retention protrusions protruding from the labial surface of the backing pattern, undercut depressions can be used, e.g. made from extruded sheets with undercut depressions.

The veneer may be cemented to the casting without investing by the use of a self-curing cement material. In such case, instead of waxing the veneer to the metal casting followed by the investment step, a dough made by mixing monomer and polymer (e.g. methyl methacrylate monomer and polymer) is applied between the metal casting and veneer followed by pressing the two together with the dough therebetween and holding them together until polymerization has occurred. Heat curing with investment is preferred because more complete polymerization and better bonding are achieved.

The above description and accompanying drawings are for illustrative purposes only and the invention is not intended to be limited thereby, such invention being defined by the following claims and including all equivalents thereof.

I claim:

1. In combination, a prefabricated plastic veneer for attachment to the labial aspect of a metal casting to form a metal tooth restoration having a plastic labial veneer, and a separate matching prefabricated thin backing pattern of heat destructible material having a labial contour matching the lingual contour of said veneer, each of said pattern and veneer having a shape of a thin curved shell of matching contour, the backing pattern shell fitting within the veneer shell with the outer convex labial contour thereof facing the matching inner, concave, lingual contour of said veneer, said veneer being removably tacked to said backing pattern with its concave lingual contour against the matching convex labial contour of said backing pattern, said inner concave surface of said veneer shell being substantially uninterrupted, and a plurality of small undercut protrusions distributed over and extending from the convex labial surface of said backing pattern.

2. A method of forming a tooth restoration made up of a metal casting with a thin, labial plastic veneer attached thereto, said method comprising forming a wax pattern, adapted to fit over and conform to a tooth stump, to the lingual surface of a prefabricated backing pattern of a heat destructible material having the shape of a thin, curved shell, the lingual surface of which is concave and the labial surface of which is convex, such shape corresponding to the shape of the labial portion of the metal casting, to form a heat destructible assembly pattern made up of said wax and backing patterns, the labial contour of said prefabricated backing pattern matching the lingual contour of a prefabricated plastic veneer having the shape of a thin, curved shell, the lingual contour of which is substantially uninterrupted and concave, the labial surface of which is convex, into which the backing pattern fits with a matching fit, and which eventually forms the labial veneer of the finished restoration, said labial contour of said backing pattern having a plurality of small undercut protrusions distributed thereover and extending therefrom, investing said assembly pattern, said prefabricated veneer being removably tacked to said backing pattern with its concave lingual contour against the labial convex contour of said backing pattern while said wax pattern is formed to the lingual contour of said backing pattern and being removed from said backing pattern after such pattern is formed but before said assembly pattern is invested, destroying said assembly pattern and replacing it with metal to form said metal casting corresponding in shape to said assembly pattern and having a convex labial contour which corresponds in contour to the convex labial contour of said backing pattern, which matches the concave lingual contour of said prefabricated plastic veneer and which has a plurality of integral metal undercut protrusions distributed thereover and extending therefrom corresponding in shape to said protrusions on said backing pattern, and cementing the concave lingual contour of said prefabricated veneer to said convex labial contour of said metal casting by a layer of plastic between the labial contour of the casting and the lingual contour of the veneer, in which layer of plastic said metal protrusions are embedded and which layer of plastic is chemically bonded to the lingual surface of the plastic veneer.

3. A method according to claim 2, said backing pattern being made by cementing to a thin sheet of heat destructible material by means of a heat destructible cement small particles of heat destructible material and shaping said sheet into the form of a thin, curved shell.

4. A method corresponding to claim 2, said cementing step comprising waxing said lingual contour of said prefabricated veneer to the labial contour of said metal casting, investing the resulting casting and veneer with the wax therebetween, replacing said wax between said veneer and said casting with a plastic cement and curing said cement, whereby said retention means on said labial surface of said casting is embedded in said cured cement.

References Cited

UNITED STATES PATENTS

| | | | |
|---|---|---|---|
| 1,465,473 | 8/1923 | Hansen | 32—12 X |
| 1,583,459 | 5/1926 | Hansen | 22—158 |
| 1,657,476 | 1/1928 | Inami | 22—190.1 |
| 1,675,732 | 7/1928 | Schweitzer | 22—158 |
| 1,796,470 | 3/1931 | Meyer | 22—190.1 |
| 2,744,326 | 5/1956 | Chaiken et al. | 32—12 |
| 2,930,125 | 3/1960 | Pos | 32—12 |

LOUIS G. MANCENE, *Primary Examiner.*

ROBERT E. MORGAN, *Examiner.*